(12) United States Patent
Joh

(10) Patent No.: US 8,373,913 B2
(45) Date of Patent: Feb. 12, 2013

(54) IMAGE SCANNING APPARATUS AND METHOD THEREOF

(75) Inventor: Seung-je Joh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1309 days.

(21) Appl. No.: 12/120,365

(22) Filed: May 14, 2008

(65) Prior Publication Data

US 2009/0002776 A1 Jan. 1, 2009

(30) Foreign Application Priority Data

Jun. 27, 2007 (KR) ........................ 10-2007-0063765

(51) Int. Cl.
*H04N 1/04* (2006.01)
*H05B 37/02* (2006.01)

(52) U.S. Cl. ........ 358/475; 358/474; 315/247; 315/297; 315/307; 315/312

(58) Field of Classification Search .................. None
See application file for complete search history.

(56) References Cited

U.S. PATENT DOCUMENTS

| | | | |
|---|---|---|---|
| 4,240,009 A | 12/1980 | Paul | |
| 4,958,108 A | 9/1990 | Jorgensen | |
| 5,367,223 A | 11/1994 | Eccher | |
| 5,907,742 A | 5/1999 | Johnson | |
| 5,914,871 A | 6/1999 | Lin et al. | |
| 6,919,974 B1 * | 7/2005 | Ichikawa et al. | 358/475 |
| 7,057,357 B2 * | 6/2006 | Chang | 315/224 |
| 7,298,093 B2 * | 11/2007 | Chang | 315/116 |
| 7,315,137 B2 * | 1/2008 | Chang et al. | 315/291 |
| 7,471,427 B2 * | 12/2008 | Chang | 358/475 |
| 2008/0231197 A1 * | 9/2008 | Chiba et al. | 315/106 |

FOREIGN PATENT DOCUMENTS

| | | |
|---|---|---|
| CN | 1870846 | 11/2006 |
| FR | 2 805 957 | 9/2001 |
| JP | 58211751 A * | 12/1983 |
| JP | 8-87075 | 4/1996 |

OTHER PUBLICATIONS

European Search Report dated Aug. 6, 2008 issued in EP 08158856.8.
Chinese Office Action Issued on Apr. 19, 2012 in CN Patent Application No. 200810109125.2.

* cited by examiner

*Primary Examiner* — Cheukfan Lee
(74) *Attorney, Agent, or Firm* — Stanzione & Kim, LLP

(57) ABSTRACT

An image scanning apparatus includes a light source unit having a plurality of lamps. A converter supplies power to the plurality of lamps and adjusts the power according to a desired light intensity of each the plurality of lamps. A controller controls the converter such that at least one of the lamps is overdriven for a predetermined amount of time when lamp warm-up is initiated. Thus, the length of time required to wait until an operational light intensity is reduced.

24 Claims, 4 Drawing Sheets

IMAGE SCANNING APPARATUS AND METHOD THEREOF

CROSS-REFERENCE TO RELATED APPLICATIONS

This application claims priority under 35 U.S.C. §119 from Korean Patent Application No. 10-2007-63765, filed on Jun. 27, 2007 in the Korean Intellectual Property Office, the disclosure of which is incorporated herein in its entirety by reference.

BACKGROUND OF THE INVENTION

1. Field of the Invention

The present general inventive concept relates to an image scanning apparatus and a method of scanning an image using the same, and more particularly, to an image scanning apparatus and a method of scanning an image using the same which overdrive a fluorescent lamp to decrease an amount of time required to reach an operational state, thereby reducing a length of time that a user is required to wait prior to using the image scanning apparatus (hereinafter, referred to as a warm-up time of the image scanning apparatus).

2. Description of the Related Art

An image scanning apparatus operates to scan an object, such as an original copy of text, an image, or a film, and converting the scanned image into digital data. The digital data may be displayed on a monitor of a computer system as an output image or may be printed by a printer as an output image. An image scanning apparatus is usable in a scanner to generate digital data, a facsimile to provide a facsimile function, a copier to provide a copy function, etc.

Generally, an image scanning apparatus, such as a scanner, a facsimile, or a digital copier, includes a fluorescent lamp to illuminate an original copy so that information thereon can be digitized. Cold cathode fluorescent lamps (hereinafter, referred to as CCFL(s)) are typical light sources used in such scanners to illuminate the original copy.

However, a CCFL requires a predetermined period of time after the CCFL is "struck," i.e., after the gas enclosed therein transitions into plasma, to emit an amount of light sufficient to illuminate an original copy. When a temperature is low, such as due to a penning effect of the CCFL or when a low voltage is applied, the period of time to generate the required amount of light becomes longer. Moreover, a long warm-up interval is required between the time when power is applied after an image scanning apparatus has been turned off and the time when the amount of light is sufficient for a scanning operation. Thus, the warm-up required to allow the CCFL to generate sufficient levels of light to perform scanning can be quite long.

In order to solve the above-mentioned problems, conventional techniques implement a heating unit that is separately provided around a CCFL and used to heat the vicinity of the CCFL. This technique uses the penning effect of the CCFL and maintains a high temperature to generate the required amount of light, thereby reducing the warm-up time.

However, according to the above-mentioned technique, the warm-up time may be shortened, but at least one separate heating unit is required. For this reason, system integration is more difficult and minimization of the size of the image scanning apparatus is practically unattainable. Additionally, the manufacture cost of the image scanning apparatus increases due to the added units.

SUMMARY OF THE INVENTION

The present invention provides an image scanning apparatus and a method of scanning an image using the same which overdrives a fluorescent lamp to decrease an amount of time required to generate an initial amount of light by the fluorescent lamp, thereby reducing an amount of time required to wait to use the image scanning apparatus.

Further, the present invention provides an image scanning apparatus and a method of scanning an image using the same which overdrive a fluorescent lamp so as to reduce overshooting in the light field, while decreasing the warm-up time.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image scanning apparatus including a light source unit having a plurality of lamps, a converter to supply power to the plurality of lamps so as to adjust an intensity of light emitted from each of the plurality of lamps, and a controller to control the converter such that at least one of the plurality of lamps is overdriven for a predetermined amount of time. Therefore, it is possible to reduce an amount of time required to reach a light intensity level suitable to obtain scanned image data, and thus reduce the warm-up time of the image scanning apparatus.

In the image scanning apparatus, when the predetermined amount of time elapses, the controller may control the converter to decrease the power to the at least one overdriven fluorescent lamp.

Further, the controller may control the converter so that a combined intensity of light from the plurality of lamps is equal to or less than a target light intensity value.

The image scanning apparatus may further include a sensing unit to measure an amount of light of the light source unit. In this case, when the predetermined amount of time elapses, the controller may control the converter so that the intensity of light of the light source unit is maintained at a constant level.

The converter may include an inverter to output modulated power corresponding to the characteristics of the plurality of lamps, and a transformer to convert the modulated power from the inverter to AC power and to supply the AC power to the plurality of lamps.

The inverter may modulate the power according to a light response curve defined to correspond to the light characteristics of the image scanning apparatus.

Further, the inverter may provide the modulated power so that a combined intensity of light of the overdriven fluorescent lamp and the normally operating fluorescent lamp is equal to or less than a target light intensity value.

The predetermined amount of time may be 5 seconds to 10 seconds.

Further, the plurality of lamps may be cold cathode lamps.

Furthermore, a power applied to each of at least one overdriven fluorescent lamp of the plurality of lamps may be two times a power level applied to each of the other lamps.

The foregoing and/or other aspects and utilities of the present general inventive concept may also be achieved by providing an image scanning method of an image scanning apparatus having a plurality of lamps. The method includes applying power separately to each of the plurality of lamps upon initiation of warm-up of the image scanning apparatus, and overdriving at least one of the plurality of lamps and less than all of the lamps for a predetermined amount of time.

The overdriving may be performed such that a combined intensity of light of the plurality of lamps is equal to or less than a target light intensity value.

The method may further include measuring the combined intensity of light of the plurality of lamps, and, when the predetermined amount of time elapses, controlling the power supplied to each of the plurality of lamps according to the measured combined light intensity so that the combined intensity of light of the plurality of lamps is maintained at a constant level.

The foregoing and/or other aspects and utilities of the present general inventive concept may also be achieved by providing an image scanning apparatus including a plurality of independently operable light sources to respectively emit light at an intensity corresponding to an amount of power provided thereto and a temperature thereof, and a converter to generate the amount power to provide to each of the light sources. The image scanning apparatus includes a controller to control the amount of power generated by the converter so that the temperature of certain of the light sources increases at different rates than others of the light sources and so that light combined from all of the light sources is sufficient to illuminate an object and obtain scanned image data therefrom prior to at least one normally operating light source from among the light sources reaching a fully warmed-up state.

The foregoing and/or other aspects and utilities of the present general inventive concept may also be achieved by providing a method of scanning an object with an image scanning apparatus including applying first power to warm up a normally operating light source of the image scanning apparatus at a first warm-up rate, applying second power to warm up an overdriven light source of the image scanning apparatus at a second warm-up rate greater than the first warm-up rate, and obtaining scanned image data from combined light from the normally operating light source and the overdriven light source prior to the normally operating light source reaching a fully warmed-up state.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
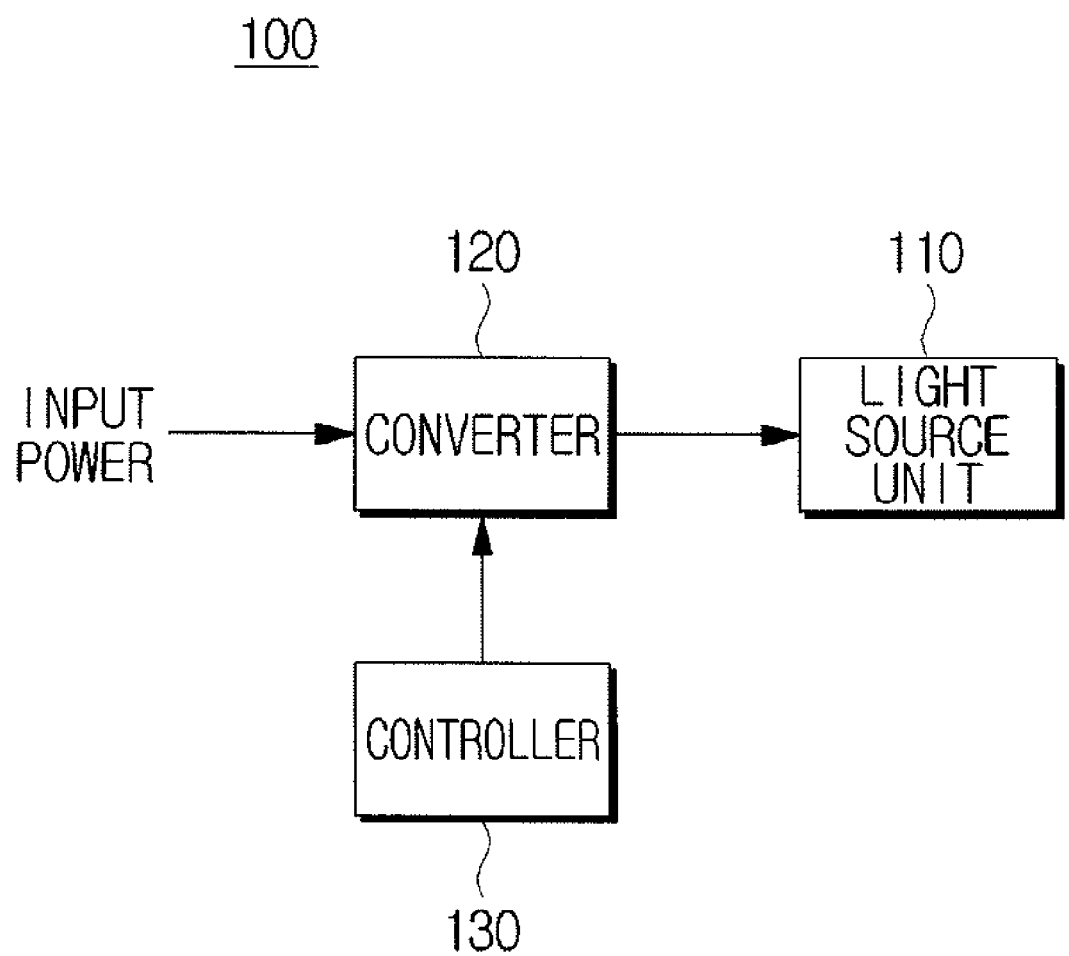
FIG. 1 is a block diagram of an image scanning apparatus according to an exemplary embodiment of the present invention.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of an image scanning apparatus according to an exemplary embodiment of the present invention. Referring to FIG. 1, the exemplary image scanning apparatus 100 comprises a light source unit 110, a converter 120, and a controller 130.

The exemplary light source unit 110 includes a plurality of light sources, which may be a plurality of fluorescent lamps. However, it is to be understood that any light source that emits light based on power provided thereto and the temperature thereof may be used with the present general inventive concept without deviating from the spirit and intended scope thereof. The light source unit 110 may be positioned close to an original copy to supply an amount of light sufficient to illuminate the original copy so that image data may be obtained therefrom. Further, the plurality of lamps may be aligned at even intervals to prevent spatial variations in the intensity of light over the plane at which the original copy is scanned. In certain embodiments of the present general inventive concept, the lamps are cold cathode fluorescent lamps (CCFLs).

The converter 120 supplies power to each of the f lamps in a manner that allows the intensity of light emitted by each lamp to be adjusted. Further, the converter 120 may include a plurality of transformers each converting power input thereto into an AC current and an inverter to produce a voltage having a frequency matching the gas discharge characteristics of the lamps. Specifically, the converter 120 converts power input thereto into an AC power corresponding to the characteristics of the lamps, and supplies the AC power to the lamps.

When the image scanning apparatus 100 is turned on to start a warm-up process, the controller 130 controls the converter 120 to supply power to the lamps. Specifically, when warm-up starts, the converter 120 increases the output power to certain of the lamps for a predetermined period of time under control of the controller 130 to overdrive those lamps, i.e., to drive the fluorescent lamp with power greater than that required to sustain light emission by gas discharge. In certain embodiments of the present general inventive concept, normal power, the power level at which gas discharge light emission is sustained, is applied to at least one of the lamps. After the predetermined amount of time elapses, the controller 130 may control the converter 120 to apply normal power to those lamps that were being overdriven. However, during the predetermined amount of time, the overdriven lamp may be warmed-up at a rate in excess of the rate at which other lamps in lighting unit 110 are warmed-up.

Further, the controller 130 may control the converter 120 to operate such that combined intensity of light emitted by the plurality of lamps is equal to or less than a target light intensity value. Specifically, the controller 130 may control the converter 120 such that a combined amount of light by the plurality of lamps driven with the normal power, hereinafter referred to as normally driven lamps, and by the overdriven lamps does not exceed the target light intensity value. In this case, the target light intensity value is determined as a designed target intensity value established by the performance characteristics of the lamps and the system configuration.

Further, the controller 130 may divide the predetermined length of time over which the overdrive power is applied into a plurality of time periods and may alternately overdrive the fluorescent lamp in each time period. Alternatively, the controller 130 may provide the overdrive power to alternating ones of the lamps during the warm-up period. Additionally, the controller 130 may overdrive a different fluorescent lamp every warm-up period.

In certain embodiments of the present general inventive concept, the predetermined length of time over which the overdrive power is applied is controlled to be from 5 seconds to 10 seconds depending on the performance of the lamps and the system configuration. Further, the overdriving power may be controlled during the predetermined time interval to be two times the normal power.

Figure 2:
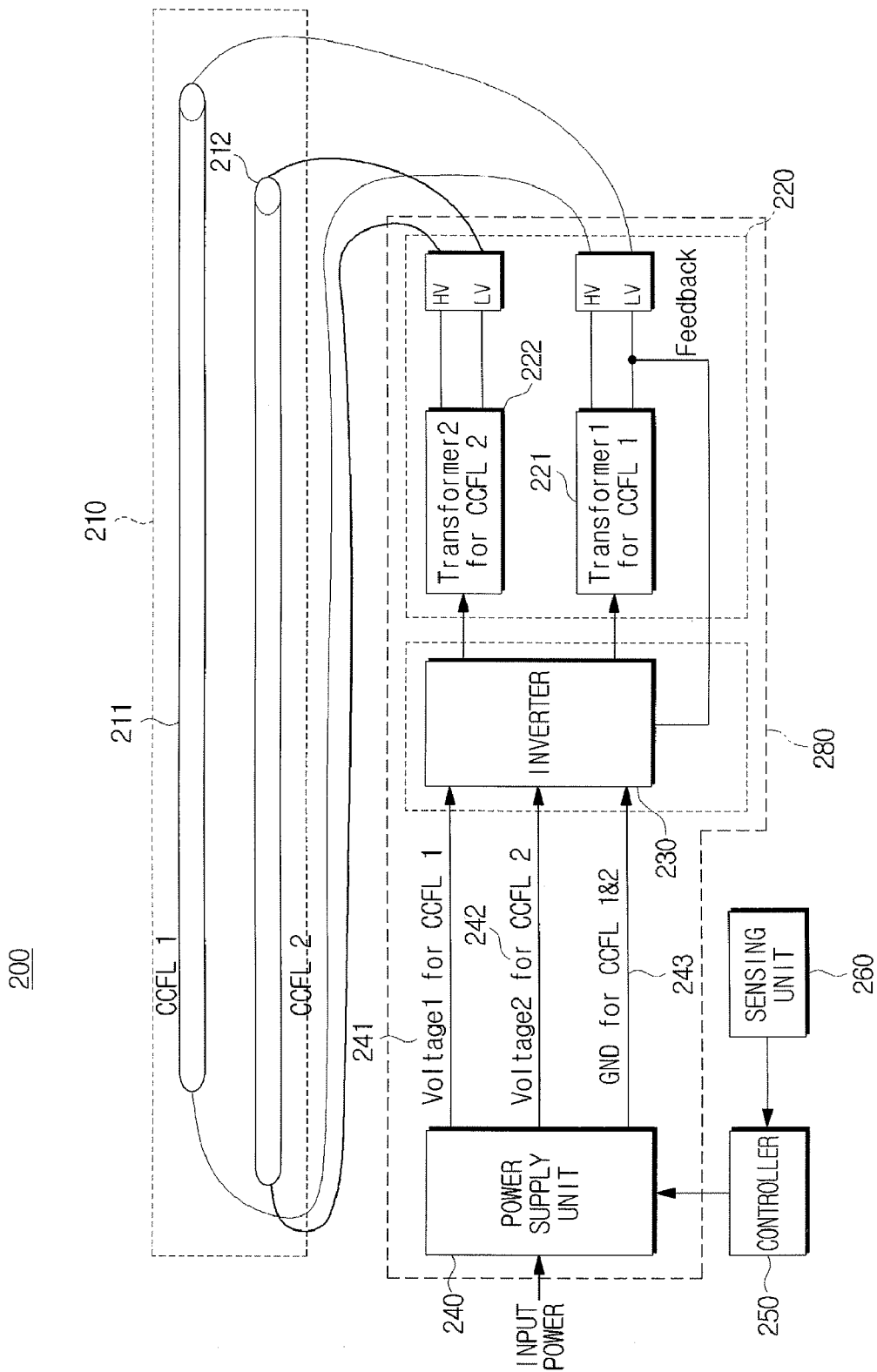
FIG. 2 is a drawing illustrating an internal configuration of an image scanning apparatus according to an exemplary embodiment of the present invention.

FIG. 2 is a schematic block diagram illustrating an internal configuration of an image scanning apparatus 200 according to an exemplary embodiment of the present general inventive concept. Referring to FIG. 2, the exemplary image scanning apparatus 200 includes a CCFL unit 210, a transformer unit 220, an inverter 230, a power supply unit 240, a controller 250, and a sensing unit 260. The power supply unit 240, the inverter 230, and the transformer unit 220 may form a converter unit 280, which may correspond to the converter 120 in FIG. 1.

The CCFL unit 210 may include a CCFL1 211 and a CCFL2 212. The CCFL1 211 and the CCFL2 212 may be aligned in parallel and spaced at predetermined intervals to provide a substantially uniform illumination field to an image.

The exemplary transformer unit 220 supplies AC power to each of the CCFL1 211 and the CCFL2 212. Since the CCFL1 211 and CCFL2 212 are each driven by a separate AC power line, the transformer unit 220 provides a controlled level of AC power to each CCFL 211, 212 in CCFL unit 210. In certain embodiments of the present general inventive concept, the number of transformers 221, 222 in transformer unit 210 is the same as the number of CCFLs 211, 212 in CCFL unit 210.

The exemplary inverter 230 provides a modulated voltage and current corresponding to the type and length of each CCFL 211, 212 in the CCFL unit 210. A plurality of inverters 230 may be provided to drive the CCFL1 211 and CCFL2 212, respectively. Alternatively, one inverter 230 may be provided to drive both CCFL1 211 and CCFL2 212. However, it is to be understood that the respective geometries and electrical characteristics of CCFL1 211 and CCFL 212 may be different, and the inverter 230, whether embodied as a single component or distributed across multiple components, is configured to produce the appropriate modulated power to each CCFL accordingly.

Further, the inverter 230 may establish the power level to be supplied to the transformer unit 220, such as through a pulse width modulation technique, according to a light intensity response curve defining the emission response of each CCFL incorporated in the image scanning apparatus. Specifically, the inverter 230 may adjust, for example, the duty cycle of the applied voltage over time according to the light intensity curve to maintain a predetermined light emission level. The light intensity curve may define a variation in the intensity of light emitted from the CCFL at a given power level per a unit variation in time, taking into account the performance of CCFL in the system environment.

The inverter 230 may operate so that a total combined intensity of light of overdriven lamps and normally driven lamps is equal to or less than a target light intensity value. Specifically, the light emitted by the overdriven fluorescent lamp may be controlled according to response characteristics thereof in the particular system environment, such as defined in the light intensity response curve, such that the combined intensity of light from the overdriven lamps and the normally driven lamps is equal to or less than the target light intensity value. The target light intensity value may be a combined light intensity value of all of the lamps when all are at their respective fully warmed-up state.

Further, the inverter 230 may control the power supplied to the CCFL unit 210 by way of a suitable feedback configuration of the output power fed back from the transformer unit 220, as illustrated in FIG. 2. It is to be understood that more than one inverter channel may be controlled by feedback, whereby multiple inverter channels may be independently controlled. Alternatively, one inverter channel may be selected as representative of all of the outputs, or only the inverter channel that is being dynamically controlled, such as the overdriven power channel, may be controlled through feedback. Various inverter control mechanisms and configurations may be used with the present general inventive concept without departing from the spirit and intended scope thereof.

The power supply unit 240 supplies power to the inverter 230, such as through a direct current and voltage converted from externally provided input power, such as an AC main power supply. The power supply unit 240 may be implemented to supply the CCFL unit 210 with separately controlled variable power over separate power supply lines 241, 242, and 243 to supply power individually to each CCFL 211, 212 in CCFL unit 210.

The sensing unit 260 may include a sensor to measure an intensity of light at a given measurement point, such as at the scan plane. Further, the sensing unit 260 may measure the intensity of light of the fluorescent lamp and may transmit the measurement via a suitable signal to the controller 250. In certain embodiments of the present general inventive concept, the controller 250 may provide a signal to power supply 240 to adjust the power to one or more of the CCFLs 211, 212 in CCFL unit 210 according to the intensity of light measured by the sensing unit 260.

Figure 3:
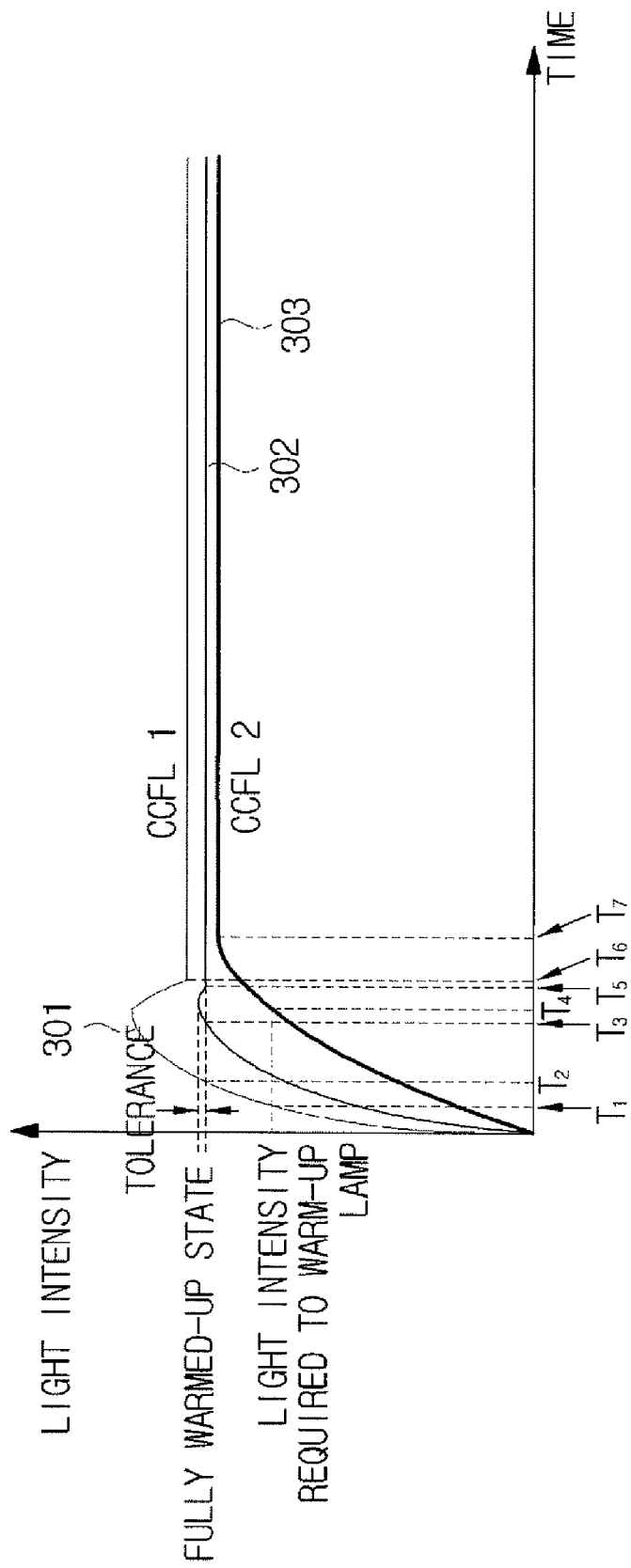
FIG. 3 is a graph illustrating variations in light emitted from the fluorescent lamps in the image scanning apparatus according to an exemplary embodiment of the present invention.

When power is applied to the image scanning apparatus 200, the power supply unit 240 supplies the power to the inverter 230. Then, on the basis of the supplied power, the inverter 230 applies modulated power to each of the transformers 221 and 222, and each of the transformers 221 and 222 supplies an AC power, such as a sinusoidal AC voltage and current of a frequency controlled by the inverter 230, to each CCFL 211, 212 in the CCFL unit 210. The CCFL unit 210 starts to emit light once the plasma state is reached in response to the application of the supplied AC power. As is well known, the plasma discharge generating the light emissions contribute to the warming up of the fluorescent lamp, which is taken into account in the light intensity response curve. The initial time period to warm-up a particular lamp, such as illustrated at time T4 in FIG. 3, is the point in time at which the plasma discharge contributes to the heating of the lamp.

In certain embodiments of the present general inventive concept, the controller 250 generates a control signal so that the overdrive power of, for example, two times the normal power is provided by the power supply unit 240 to overdrive, for example, CCFL1 211. The power is supplied to the CCFL1 211 through the power supply line 241 of the power supply unit 240, and an input current becomes larger than a normal current such that the CCFL1 211 is overdriven. Therefore, the intensity of light emitted from the CCFL1 211 is different from the intensity of light emitted from the CCFL2 212. However, in certain embodiments of the present general inventive concept, a target illumination region of an input image is positioned between two CCFL1 211 and CCFL2 212 in CCFL unit 210, and the amount of light in the target region is the combined intensity of light emitted from the CCFL1 211 and the CCFL2 212.

Meanwhile, after the predetermined amount of time elapses, the controller 250 generates a control signal to provide normal power to the CCFL1 211, at which point the CCFL1 211 is no longer overdriven.

Further, the controller 250 may control the power applied to the lamps on the basis of the light intensity measured by the sensing unit 260 after the predetermined amount of time elapses so that the combined intensity of light emitted from all of the lamps remains constant.

In FIG. 2, the exemplary image scanning apparatus includes two CCFLs, that is, the CCFL1 211 and the CCFL2 212. However, the present general inventive concept can be applied to an image scanning apparatus having three or more CCFLs without departing from the spirit and intended scope thereof.

FIG. 3 is a graph illustrating variations in intensities of light emitted from the lamps in the image scanning apparatus according to the exemplary embodiment of the present invention. Referring to FIG. 3, a first line 301 represents a variation in the intensity of light when the overdriving power is applied to the CCFL1, and a third line 303 represents a variation of in the intensity of light when normal power is applied to the CCFL2. The line 302 represents a combined intensity of CCFL1 and CCFL2, on a modified scale so as to be placed between lines 301 and 303. Moreover, it is to be understood that in certain embodiments of the present general inventive concept, the intensities of the lamps may be either equivalent or different at steady state with equivalent power applied thereto, although lines 301 and 303 have been separated in FIG. 3 for purposes of clarity.

Referring to FIG. 3, the time required to reach an initial amount of light from CCFL2 receiving normal power required to warm-up by plasma discharge, is T4, and the amount of time to reach a fully warmed-up state is T7. However, the amount of time to reach an initial amount of light to warm up CCFL1 to which the overdriving power is applied is T1, and the time to reach the scanning intensity is T2, although at that time T2, the intensity of CCFL1 overshoots the target scanning intensity. In certain embodiments of the present general inventive concept, the overdrive power is removed after a predetermined time interval and the intensity level of CCFL1 returns to the scanning intensity at time T6.

By overdriving the CCFL, it is possible to reduce the initial amount of time required for warm-up of the image scanning device, as is illustrated in the combined intensity curve 302 at time T3. However, overshooting the target intensity may occur as illustrated at time T2 in the first line 301. When a CCFL to which the overdriving power is applied and a CCFL to which the normal power is applied are used together, it is possible to substantially reduce or prevent overshooting in the combined field, as illustrated at time T3 in line 302. In certain embodiments of the present general inventive concept, the overshooting in the combined field is maintained to within a predetermined tolerance range, as is illustrated in FIG. 3. Therefore, it is possible to reduce both overshooting, as illustrated between times T3 and T5 in line 302, and the length of time to wait before the light intensity is sufficient to scan, as illustrated at time T3 in line 302.

For this reason, certain embodiments of the present general inventive concept include two lamps in the image scanning apparatus, the normal power is applied to one of the lamps, and the overdriving power is applied to the other fluorescent lamp, thereby reducing the wait time.

The light intensity may be controlled to follow a response curve so that the overshooting in the combined light field lies within a tolerance range according to the system environment, as is illustrated in FIG. 3.

Figure 4:
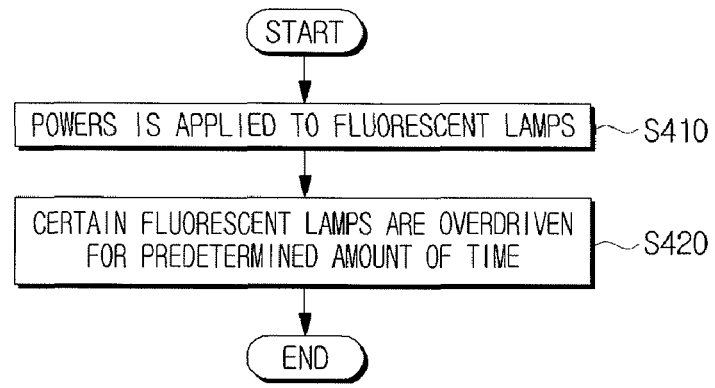
FIG. 4 is a flow chart illustrating an image scanning method according to an exemplary embodiment.

FIG. 4 is a flow chart illustrating an image scanning method according to an exemplary embodiment. First, when an image scanning apparatus is turned on to initiate warm-up, in operation S410, power is applied to each of a plurality of lamps.

Then, in operation S420, the image scanning apparatus overdrives at least one of the plurality of lamps with an overdriving voltage. In this case, a normal voltage may be applied to the other lamps. When an initial power is applied to the fluorescent lamp, the amount of light of the fluorescent lamp increases. Further, when overdriving is performed, some of the lamps may be overdriven with the overdriving voltage so that a combined intensity of light from all of the lamps is equal to or less than the target light intensity value.

Then, after the predetermined amount of time elapses, in operation S420, the image scanning apparatus applies the normal power to the overdriven lamps. The predetermined amount of time for which the lamps are overdriven can be controlled according to the characteristics of the lamps, such as an intensity at a provided power level versus time.

Figure 5:
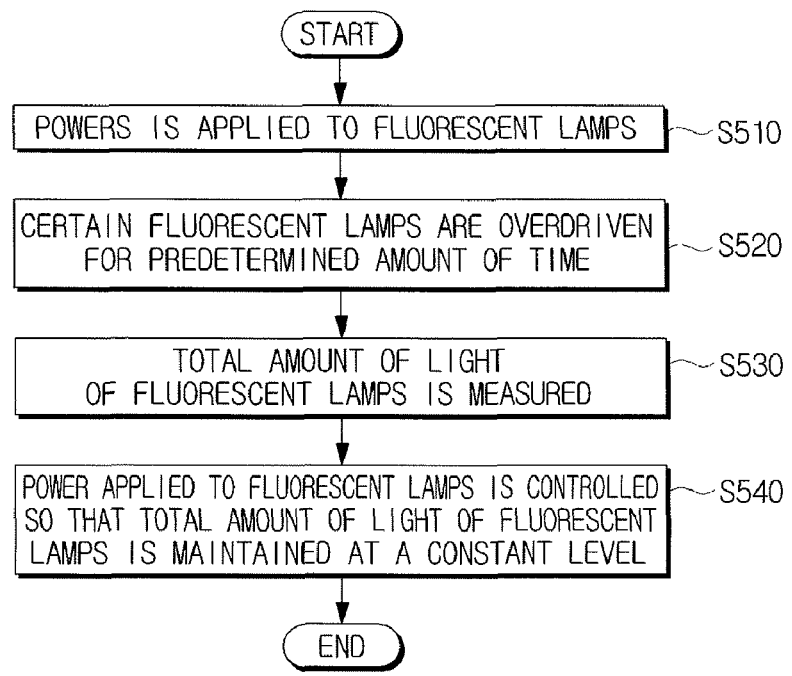
FIG. 5 is a flowchart illustrating an image scanning method according to another exemplary embodiment of the present invention.

FIG. 5 is a flow chart illustrating an image scanning method according to an exemplary embodiment. First, after a predetermined amount of time elapses from the time when certain of a plurality of lamps are overdriven, in operation S530, an image scanning apparatus measures a combined intensity of light emitted from the plurality of lamps.

Then, in operation S540, the image scanning apparatus controls the power applied to the lamps according to the measured intensity of light such that a constant light intensity illuminates an object to be scanned. Therefore, when some of the plurality of lamps are overdriven, it is possible to reduce the amount of time required to reach a needed amount of light and thus to reduce the warm-up time. The image scanning methods illustrated in FIGS. 4 and 5 can be performed in an image scanning apparatus having a structure illustrated in FIG. 1 or FIG. 2, and may be performed by other image scanning apparatuses.

As described above, according to exemplary embodiments of the present invention, when an initial power is applied to an image scanning apparatus, at least one fluorescent lamp is overdriven with an overshooting power, which makes it possible to reduce an amount of time required to reach an initial amount of light required to perform image scanning and thus to reduce an initial amount of warm-up wait time of the image scanning apparatus.

Further, at least one fluorescent lamp operates under normal power such that the combined light intensity of the normally operating lamps and the overdriven lamps substantially avoids overshooting the target light intensity of all of the lamps.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:
1. An image scanning apparatus comprising:
  a light source unit comprising lamps;
  a converter to supply power to the lamps so as to individually adjust the intensity of light emitted from each of the lamps; and
  a controller to control the converter such that at least one of the lamps is overdriven while at least one of the lamps is normally driven, for a predetermined amount of time.
2. The apparatus as claimed in claim 1, wherein, when the predetermined amount of time elapses, the controller controls the converter to decrease the power applied to the at least one overdriven lamp.

3. The apparatus as claimed in claim 1, wherein the controller controls the converter so that a combined intensity of light from the lamps is equal to or less than a target light intensity value.

4. The apparatus as claimed in claim 1, further comprising:
a sensing unit to measure the intensity of light emitted from the light source unit,
wherein, the controller controls the converter when the predetermined amount of time elapses so that the intensity of light of the light source unit is maintained at a constant level.

5. The apparatus as claimed in claim 1, wherein the converter comprises:
an inverter to output modulated power corresponding to the characteristics of the lamps; and
a transformer to convert the output modulated power of the inverter to AC power and to supply the AC power to the lamps.

6. The apparatus as claimed in claim 1, wherein the predetermined amount of time is 5 seconds to 10 seconds.

7. The apparatus as claimed in claim 1, wherein the lamps are cold cathode lamps.

8. The apparatus as claimed in claim 1, wherein twice the power is applied to each overdriven lamp as compared to each normally driven lamp.

9. An image scanning method of an image scanning apparatus comprising lamps, the method comprising:
applying power by a controlled power supply unit separately to the lamps during a warm-up operation of the image scanning apparatus; and
overdriving at least one of the lamps while normally driving at least one of the lamps, for a predetermined amount of time.

10. The method as claimed in claim 9, wherein the overdriving is performed such that a combined intensity of light of the lamps is equal to or less than a target light intensity.

11. The method as claimed in claim 9, further comprising:
measuring the combined light intensity of the lamps; and
controlling the power supplied to each of the lamps according to the measured light intensity so that the combined light intensity is maintained at a constant level after the predetermined amount of time elapses.

12. The method as claimed in claim 9, wherein the predetermined amount of time is 5 seconds to 10 seconds.

13. The method as claimed in claim 9, wherein the lamps are cold cathode lamps.

14. The method as claimed in claim 9, wherein twice the power is applied to each overdriven fluorescent lamp as compared to the power applied to each normally driven lamp.

15. An image scanning apparatus, comprising:
light sources to respectively emit light at an intensity corresponding to an amount of power provided thereto and a temperature thereof;
a converter to separately generate the amount power provided to each of the light sources; and
a controller to control the amount of power generated by the converter so that at least one of the light sources is overdriven while at least one of the light sources is normally driven and so that light combined from all of the light sources is sufficient to illuminate an object and obtain scanned image data therefrom prior to the at least one normally driven light source reaching a normal operating temperature.

16. The image scanning apparatus of claim 15, wherein the converter comprises:
a power supply to generate voltages and currents corresponding to the amount of power provided to each of the light sources to increase the respective temperatures thereof according to a signal from the controller.

17. The image scanning apparatus of claim 16, wherein the converter further comprises:
an inverter to generate respective modulated voltages and currents from the voltages and the currents of the power supply, the modulated voltages and currents generated at frequencies corresponding to respective excitation frequencies of the light sources; and
a transformer to generate the power to each of the light sources from the respective modulated voltages and currents from the inverter.

18. The image scanning apparatus of claim 17, wherein the converter includes a feedback circuit from the output of the transformer to the inverter to control the amount of power provided to the light sources by adjusting the modulated voltages and currents.

19. The image scanner apparatus of claim 15, wherein the controller continues to overdrive the at least one light source after the overdriven light source reaches the normal operating temperature such that the combined light is less than or equal to a predetermined light intensity prior to the normally operating light source reaching the normal operating temperature.

20. The image scanning apparatus of claim 15, wherein the controller decreases the amount of power applied to the at least one overdriven light source after the combined light is sufficient to illuminate an object.

21. The image scanning apparatus of claim 15, wherein the light sources are fluorescent lamps.

22. A method of scanning an object with an image scanning apparatus comprising:
applying first power by a controlled power supply unit to normally drive a light source of the image scanning apparatus during a warm-up period;
applying second power by the controlled power supply unit to overdrive another light source of the image scanning apparatus during the warm-up period; and
obtaining scanned image data using a combined light from the normally driven light source and the overdriven light source, prior to the normally driven light source reaching a normal operating temperature.

23. The method of scanning of claim 22, wherein the applying of the second power comprises maintaining the application of the second power after the overdriven light source reaches the normal operating temperature such that the combined light reaches a predetermined light intensity value prior to the normally operating light source reaching the normal operating temperature.

24. The method of scanning of claim 22, wherein the applying of the second power further comprises subsequently decreasing the second power when the combined light reaches a predetermined light intensity.

* * * * *